Oct. 1, 1957  F. J. McCARTHY  2,808,579
ELECTRICAL DEVICE FOR LOCATING ITEMS OF MERCHANDISE IN STORES
Filed Oct. 14, 1954  3 Sheets-Sheet 1
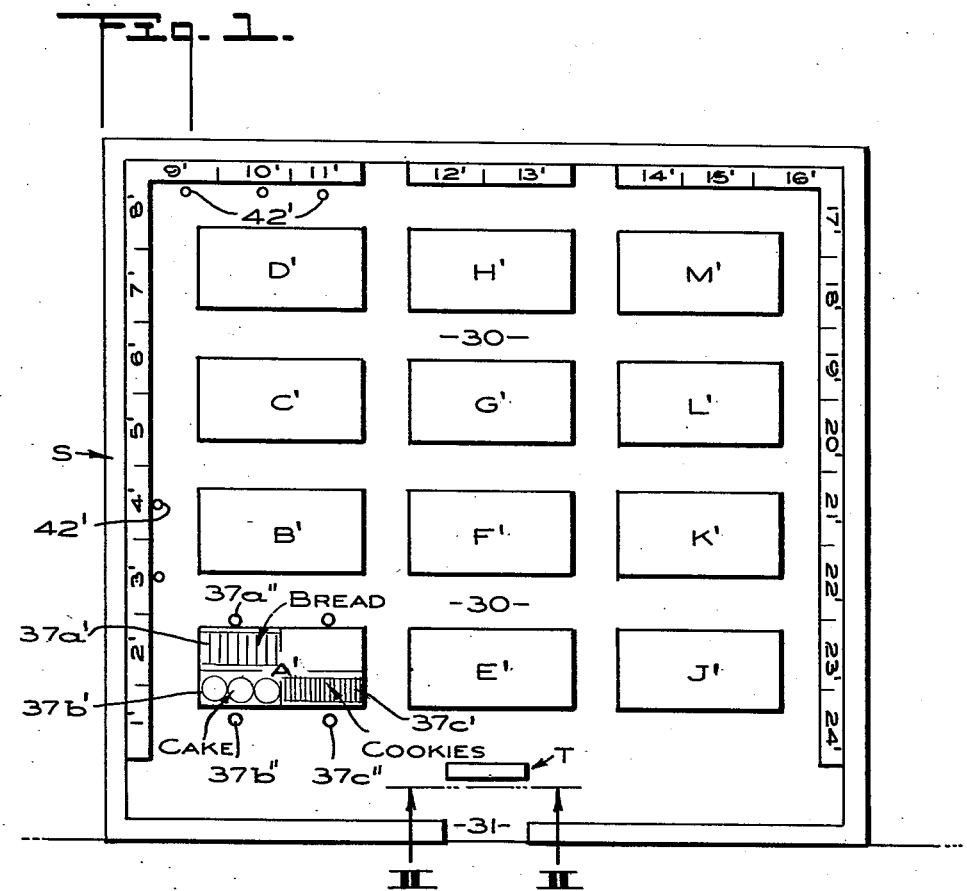
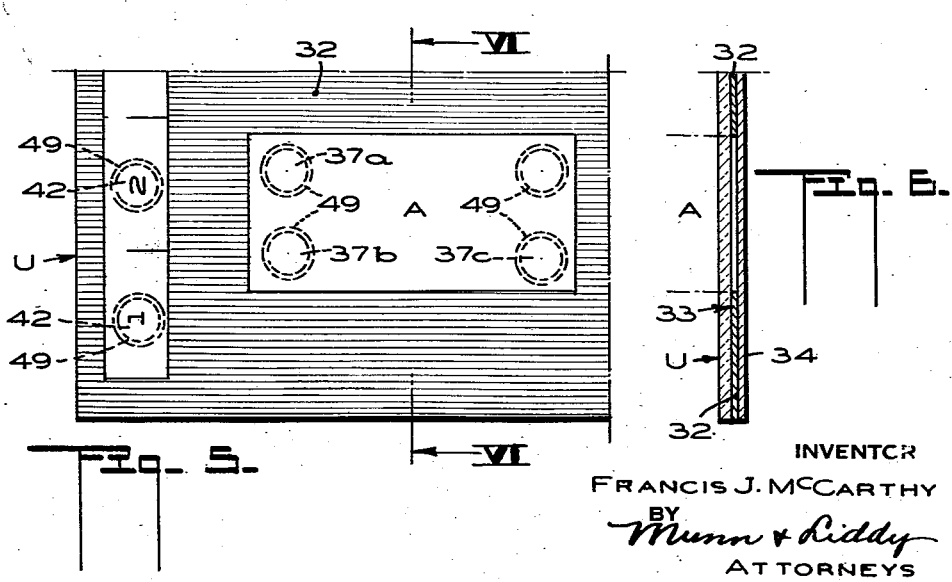
INVENTOR
FRANCIS J. McCARTHY
BY
Munn & Liddy
ATTORNEYS Oct. 1, 1957   F. J. McCARTHY   2,808,579
ELECTRICAL DEVICE FOR LOCATING ITEMS OF MERCHANDISE IN STORES
Filed Oct. 14, 1954   3 Sheets-Sheet 2

INVENTOR
FRANCIS J. McCARTHY
BY
Munn & Liddy
ATTORNEYS

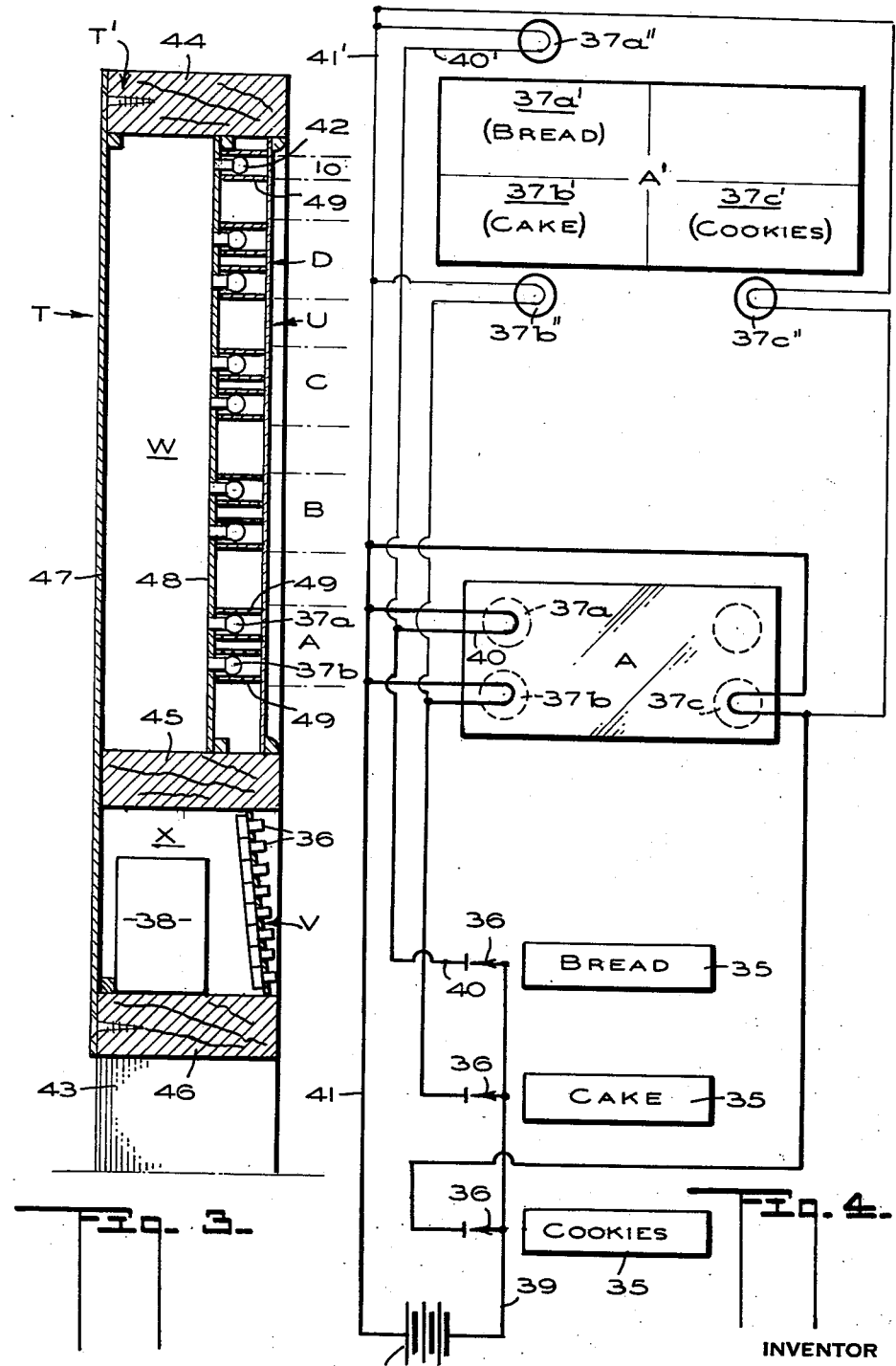

United States Patent Office 2,808,579
Patented Oct. 1, 1957

2,808,579

ELECTRICAL DEVICE FOR LOCATING ITEMS OF MERCHANDISE IN STORES

Francis J. McCarthy, San Francisco, Calif.

Application October 14, 1954, Serial No. 462,240

2 Claims. (Cl. 340—225)

It is a well-known fact that various items of merchandise are difficult to locate in large stores, supermarkets and the like, even though they are available and on display to the purchasing public.

An object of this invention is to provide an electrical device for assisting customers in locating the desired items of merchandise, and for indicating to the customer the exact location in the store in which the selected items are disposed and for guiding the customer thereto.

More specifically stated, an item finder is provided at a convenient place in the store for ready access to the customers. Various items of merchandise are listed on tabs, preferably in alphabetical order, and are displayed on the item finder, with a push button being arranged adjacent each tab. Moreover, a locator panel, forming part of the item finder, has a diagram or outline thereon, which corresponds with the floor plan of the store.

It is preferable that the aisles, counters, shelves, or other display areas, be represented on the diagram of the locator panel. Upon depressing a selected button, an area or sub-section will be illuminated on a particular part of the diagram, which corresponds to the actual location of the item in the store. Thus the customer will have the necessary directions, both as to the counter or other display area, and the location of the counter in the store, to thereby facilitate the obtaining of the desired item of merchandise.

As a further feature, lights may be arranged on or adjacent to the actual counters, shelves, or the like, which will be illuminated when the push buttons are depressed at the item finder to further aid in directing the customers to the particular location in the store where the items will be found.

Another object of this invention is to provide a device of the character described, which is simple in construction, durable and efficient for the purpose intended, and attractive in appearance. The item finder may be easily adjusted to take care of changes in the display areas of the store.

Other objects and advantages will appear as the specification continues. The novel features will be pointed out in the claims hereunto appended.

Drawings

For a better understanding of the invention, reference should be had to the accompanying drawings, forming part of this application, in which:

Figure 1 is a plan view of a store having my item finder installed therein;

Figure 3 is a transverse sectional view taken along the vertical plane III—III of Figure 2;

Figure 4 is a schematic wiring diagram;

Figure 5 is an enlarged frontal view of the lower left-hand portion of the locator panel shown in Figure 2; and Figure 6 is a vertical sectional view taken along the line VI—VI of Figure 5.

Figure 2:
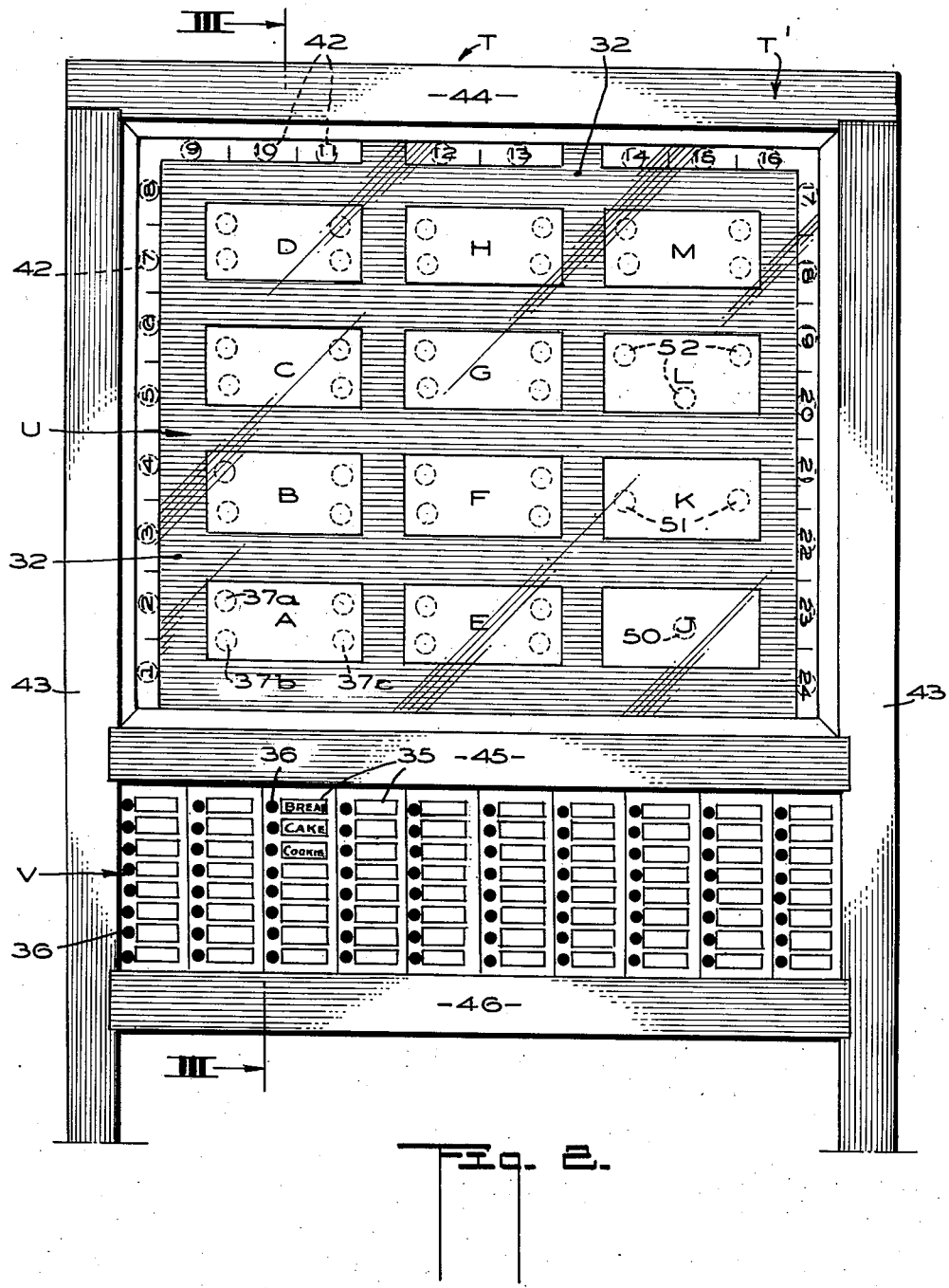
Figure 2 is a front elevational view of the item finder.

While I have shown only the preferred form of my invention, it should be understood that various changes, or modifications, may be made within the scope of the annexed claims without departing from the spirit thereof.

Detailed description

Referring to the drawings in detail, Figure 1 discloses the floor plan of a store S, it being understood that this plan has been selected for the purpose of illustration only. Of course, the interior arrangements of stores vary widely from one another. As shown herein, a plurality of counters A'–H' and J'–M' have been arranged in a conventional manner to provide aisles 30 therebetween. Also, shelves 1'–24' have been included as being disposed along the walls of the store, and an entrance way has been designated at 31. Broadly speaking, the counters and shelves may be referred to as "merchandise-displaying sections" of the store.

In Figure 1, my item finder is indicated generally at T and has been located adjacent the entrance so as to be readily available to customers entering the store.

As previously stated, I do not wish to be limited in any respect in connection with the floor plan of the store, since such a plan depends upon other requirements, and my item finder may be easily adapted to the plan already in existence. Moreover, as will be apparent later, my item finder may be changed so as to keep abreast of rearrangements in the store.

It will be noted from Figures 2 to 6, inclusive, that the item finder T is provided at its front with a locator panel U. This panel has a plurality of translucent areas A–H and J–M, which are related to one another in the same manner and arrangement as the counters A'–H' and J'–M', respectively. Moreover, translucent areas 1–24 are provided on the locator panel U in the same way as the counters 1–24 in the store S.

Actually the counters and shelves in the store will be lettered or numbered without being primed ('); but the priming in the drawings has been resorted to in order to distinguish from corresponding areas on the item finder. In practice, the panel U is made of transparent glass, and paint 32, or other masking material, covers the rear surface 33 of this glass (see Figure 6), with the exception of the translucent areas A–H, J–M and 1–24. The opaque parts of the panel U, as formed by the paint 32, has been shown by horizontally-extending shade lines on this panel in Figures 2 and 5, and correspond with the aisles in the store.

Turning to Figure 6, it will be observed that a translucent sheet of material 34, such as parchment or tracing paper, is applied over the back of the panel U. Thus the portions of the panel that are not covered by the opaque paint, together with sheet 34, actually provide the translucent areas of the panel, when the latter is viewed from the front of the item finder.

Particular attention is called to the fact that diagram or outline on the locator panel U exactly corresponds with the floor plan of the store S (compare Figures 1 and 2). This is important, since upon illuminating a selected portion of one of the translucent areas on the panel U, in the manner hereinafter described, the customer will be informed of the exact location of a desired article of merchandise in the store. When a customer stands in front of the item finder T, the latter is correctly oriented with reference to the store.

The front of the item finder T has a selector panel V mounted thereon, which includes a plurality of tabs 35 having items of merchandise listed thereon. For simplicity sake, these items have been shown as "Bread,"

"Cake" and "Cookies" in Figures 2 and 4. It will be assumed, by way of example only, that these three items are displayed on the counter A' of the store, as suggested by corresponding legends in Figure 1. The upper portion of the wiring diagram in Figure 4 further shows this same counter with appropriate legends thereon.

Each tab 35 has a push button 36, or switch, arranged adjacent thereto, which is connected into an electrical circuit in the manner shown in the schematic wiring diagram in Figure 4, and described in detail hereinafter. By way of illustration, lights 37a, 37b and 37c have been mounted in back of the translucent area A on the locator panel U in Figures 2, 3, 4 and 5.

Assuming that a customer desires to make a purchase of "bread" in the store, the push button 36 adjacent to the tab 35 bearing the legend "Bread" is depressed. Referring to Figure 4, it will be obvious that current will flow from one side of a battery 38 (or other suitable source of current) over a wire 39 to one terminal of the upper switch 36 (adjacent the tab "Bread"). A wire 40 leads from the other terminal of this particular switch to the filament of the light 37a, and thence the current will flow over a return wire 41 back to the other side of the battery. This will result in illuminating the light 37a in back of the translucent area A.

This will inform the customer of the particular counter of the store in which "bread" will be found. Moreover, the light 37a is disposed in a sub-section of the translucent area A (see Figures 2 and 5), which corresponds with the sub-section 37a' of the counter A'. As previously stated, the diagram on the locator panel U, which the customer is viewing at the time of making a selection, corresponds with the floor plan of the store. Furthermore, the item finder is oriented relative to the store. Thus the customer has all of the necessary information to indicate the direction of movement to be taken, when walking from the item finder T to the counter A', and upon arrival thereat will know the particular sub-section of the counter on which the item "bread" is disposed.

As a further aid to the customer, a light 37a" has been illustrated in Figures 1 and 4 as being mounted on or adjacent to the counter A'. This light is connected by wires 40' and 41' in parallel with the light 37a (see Figure 4); and thus the light 37a" will be illuminated when the switch 36 adjacent the "Bread" tab 35 is depressed. While the customer is still in front of the item finder, the light 37a" will indicate the location of the selected item in the store. Of course, the lights 37a and 37a" could be wired in series, if desired.

In a like manner, the location of "Cake" and "Cookies" in the sub-sections 37b' and 37c', respectively, of the counter A' may be determined. Also, lights 37b" and 37c" have been provided on or adjacent to the sections for "Cake" and "Cookies" of the counter A' (see Figures 1 and 4) for the purpose of guiding the customer thereto. The electrical circuits for the lights 37b—37b" and 37c—37c" are exactly the same as that described for the lights 37a—37a"; and no further description is necessary.

Reference is made to Figures 2, 3 and 5, in which it will be seen that lights 42 are provided behind the translucent areas 1–24 on the locator panel U to thereby indicate locations of various items of merchandise on the shelves 1'–24', respectively. These lights are wired to the proper switches 36 on the selector panel V. Auxiliary lights 42' may be provided at the shelves 1–24 in the store, if desired, and serve the same purpose as the lights 37a", 37b" and 37c" previously mentioned. Of course, the light 42' at each shelf is wired in parallel or in series with its corresponding light 42 on the locator panel.

With respect to the structural features of the item finder T, it consists of a supporting frame T' including spaced-apart upright sides 43. The latter are interconnected by top, intermediate and bottom rails 44, 45 and 46, respectively. The upright sides 43 and rails 44—45 define a rectangular opening in which the locator panel U is mounted. In a like manner, the sides 43 and rails 45—46 provide an elongated opening having the selector panel V arranged therein.

The frame of the item finder defines compartments W and X behind the locator panel U and selector panel V, respectively, for accommodation of the necessary wirings. Also, the battery 38 may be housed in one of the compartments (see Figure 3). A removable cover 47 has been provided at the back of the item finder for giving access to the compartments W and X.

As shown in Figure 3, a light-supporting panel 48 is mounted in the compartment W, and the various lights of the item finder (such as 37a, 37b and 42) are carried by the panel. As shown in Figures 3 and 5, tubular shields 49 surround the lights in the item finder, and extend between the panels U and 48. The purpose of these shields is to confine and direct the rays emanating from each light to the particular portion or section of the translucent area (such as A) of the locator panel arranged in front thereof.

For the purpose of facilitating the customer in reading the tabs 35 and selecting the proper buttons 36, the selector panel V has been inclined upwardly and rearwardly relative to the vertical (see Figure 3).

It will be appreciated that the number and location of the lights behind the translucent areas A–H and J–M depend upon the arrangement of the items of merchandise on the counters A'–H' and J'–M'. For purpose of illustration only, the transparent area J has been provided with one light 50; the area K with two lights 51; the area L with three lights 52; and the remaining areas A–H and M with four lights each.

Of course, the lights at the counters and shelves (such as 37a" and 42', respectively), may be omitted, if desired; or, in the alternative, the lights behind the selector panel U (such as 37a) could be dispensed with; or both sets of lights may be utilized simultaneously.

*Summary of operation*

The operation of my electrical device for locating items of merchandise in stores is summarized briefly as follows:

Assuming that the item finder T has been installed in the store S near the entrance way 31, as shown in Figure 1, and that a customer enters the store to purchase "bread," the customer depresses the switch 36 disposed adjacent to the "Bread" tab 35 on the selector panel V (see Figures 2 and 4). This will result in illuminating the light 37a disposed behind the translucent area A on the locator panel U.

Inasmuch as the diagram on the locator panel is a true representation of the floor plan of the store, and aided by the further fact that the item finder T is oriented relative to the store, the customer will have been informed that this particular item is displayed on counter A; and, moreover, the customer will know the location of this counter in the store. Furthermore, the customer has been informed that the bread is located in a particular sub-section (37a') of counter A'.

As a further aid in directing the customer to the "bread," the light 37a" at counter A' will be illuminated simultaneously with the light 37a. By observing the light 37a", the customer will be informed of the exact location of the counter.

As previously pointed out, either the lights on the item finder T, or those at the counters and shelves of the store, may be used, or both may be used in combination. However, when the lights at the counters and shelves are eliminated, the item finder may be installed as a self-contained unitary structure, without extending other wires to various parts of the store.

I claim:

1. In an electrical device for locating items of merchandise in a store: a locator panel having a diagram thereon representing the floor plan of a store; the diagram including a plurality of areas corresponding with merchandise-displaying sections of the store; each of said areas on the locator panel having at least one light associated therewith and disposed to illuminate that area with which the light is associated; a selector panel having a plurality of items of merchandise listed thereon; an individual switch disposed adjacent to each listing on the selector panel; electrical circuits connecting each of the switches to one of the lights, whereby closing of a selected switch by a customer, in accordance with a listing on the selector panel, will illuminate a predetermined area on the locator panel, and thereby indicate to the customer the location of the section of the store in which the desired item is located; additional lights disposed in the merchandise-displaying sections of the store within view of the customer at the locator panel; and electrical circuits for illuminating one of the lights in a store section when a corresponding light is illuminated on the locator panel, thus indicating to the customer the direction of travel from the selector panel to the desired section of the store.

2. The combination with a store having mechandise display sections, an electrical device for locating items of merchandise in said store, said electrical device comprising a locator panel having a diagram thereon delineating the floor plan of the store, said diagram including a plurality of areas representing said sections, each of said areas on the locator panel bearing indicia corresponding with like indicia posted at the store sections, each of said areas on said locator panel having at least one light displayed therewith and disposed to illuminate that area with which the particular light is associated, a selector panel having a plurality of items of merchandise listed thereon, an individual switch disposed adjacent to each listing on said selector panel, electrical circuits connecting each of the switches to one of the lights, indicating means located at said sections within view of a customer positioned adjacent said selector panel, electrical circuits connecting each of said indicator means to one of said switches whereby closing of a selected switch by a customer in accordance with a listing on the selector panel will illuminate a predetermined area on the locator panel and will operate the corresponding indicator means located at the corresponding section and thereby indicate to the customer by means of said locator panel and said indicating means the location of the display section in the store on which the desired item is located.

References Cited in the file of this patent

UNITED STATES PATENTS

| | | |
|---|---|---|
| 998,391 | Powell | July 18, 1911 |
| 1,637,685 | Cowles | Aug. 2, 1927 |
| 1,655,294 | Robinson | Jan. 3, 1928 |
| 1,727,840 | Bardee | Sept. 10, 1929 |
| 1,976,600 | Carroll | Oct. 9, 1934 |